(12) United States Patent
Horst

(10) Patent No.: US 9,893,604 B2
(45) Date of Patent: Feb. 13, 2018

(54) CIRCUIT WITH LOW DC BIAS STORAGE CAPACITORS FOR HIGH DENSITY POWER CONVERSION

(71) Applicant: Robert W. Horst, San Jose, CA (US)

(72) Inventor: Robert W. Horst, San Jose, CA (US)

( * ) Notice: Subject to any disclaimer, the term of this patent is extended or adjusted under 35 U.S.C. 154(b) by 0 days.

(21) Appl. No.: 15/216,487

(22) Filed: Jul. 21, 2016

(65) Prior Publication Data

US 2017/0025970 A1 Jan. 26, 2017

Related U.S. Application Data

(60) Provisional application No. 62/195,207, filed on Jul. 21, 2015.

(51) Int. Cl.
*H02M 7/44* (2006.01)
*H02M 1/15* (2006.01)
*H02M 1/42* (2007.01)
*H02M 7/04* (2006.01)
*H02M 3/158* (2006.01)
*H02M 7/155* (2006.01)
*H02M 7/537* (2006.01)
*H02M 7/797* (2006.01)

(52) U.S. Cl.
CPC ........... *H02M 1/15* (2013.01); *H02M 1/4225* (2013.01); *H02M 3/158* (2013.01); *H02M 7/1555* (2013.01); *H02M 7/537* (2013.01); *H02M 7/797* (2013.01); *H02M 2001/4291* (2013.01)

(58) Field of Classification Search
CPC ............ H02M 7/44; H02M 7/04; H02M 1/15; H02M 1/42; H02M 1/4225; H02M 3/158; H02M 7/1555; H02M 7/537; H02M 7/797; H02M 2001/4291; H02M 1/14; H02M 1/143; H02M 7/66; H02M 7/68; H02M 1/44; H02M 7/757; H02M 7/758; H02M 7/48; H02M 7/523; H02M 7/72
See application file for complete search history.

(56) References Cited

U.S. PATENT DOCUMENTS 5,994,929 A * 11/1999 Sano ..................... G09G 3/2965
327/110
6,111,392 A * 8/2000 Iwahori ................. H02M 1/425
323/224

(Continued)

OTHER PUBLICATIONS

Lee, et al., "Mitigation of Low Frequency AC Ripple in Single-Phase Photovoltaic Power Conditioning Systems," Journal of Power Electronics, vol. 10, No. 3, May 2010, pp. 328-333.

(Continued)

*Primary Examiner* — Gustavo Rosario Benitez
(74) *Attorney, Agent, or Firm* — Knobbe, Martens, Olson & Bear, LLP

(57) ABSTRACT

A circuit for converting DC to AC power or AC to DC power comprises a storage capacitor, boost and buck inductors and switching elements. The switches are controlled to steer current to and from the storage capacitor to cancel DC input ripple or to provide near unity power factor AC input. The capacitor is alternately charged to high positive or negative voltages with an average DC bias near zero. The circuit is configured to deliver high-efficiency power in applications including industrial equipment, home appliances, mobility devices and electric vehicle applications.

9 Claims, 14 Drawing Sheets

(56) References Cited

U.S. PATENT DOCUMENTS

| | | | | |
|---|---|---|---|---|
| 6,459,230 B1* | 10/2002 | Tao | ............ | H02P 6/182 |
| | | | | 318/798 |
| 7,755,916 B2 | 7/2010 | Krein et al. | | |
| 8,004,865 B2 | 8/2011 | Krein et al. | | |
| 8,279,642 B2 | 10/2012 | Chapman et al. | | |
| 8,325,499 B2 | 12/2012 | Krein et al. | | |
| 8,767,421 B2 | 7/2014 | Chapman | | |
| 2001/0033505 A1* | 10/2001 | Reilly | ............ | H02J 9/062 |
| | | | | 363/125 |
| 2005/0174817 A1* | 8/2005 | Schmidt | ............ | H02M 7/48 |
| | | | | 363/97 |
| 2009/0167262 A1* | 7/2009 | Schoofs | ............ | H02M 3/07 |
| | | | | 323/263 |
| 2012/0274251 A1* | 11/2012 | Romenesko | ............ | H02P 29/50 |
| | | | | 318/400.24 |
| 2013/0063994 A1* | 3/2013 | Alexander | ............ | H02M 5/225 |
| | | | | 363/123 |
| 2015/0200056 A1* | 7/2015 | Koller | ............ | H01G 4/30 |
| | | | | 323/304 |
| 2015/0372615 A1* | 12/2015 | Ayyanar | ............ | H02M 1/15 |
| | | | | 363/131 |
| 2016/0233776 A1* | 8/2016 | Nielsen | ............ | H02M 3/33584 |

OTHER PUBLICATIONS

Kjaer, et al., "A Review of Single-Phase Grid-Connected Inverters for Photovoltaic Modules," IEEE Transactions on Industry Applications, vol. 41, No. 5, Oct. 2005, pp. 1292-1306.

Flicker, et al., "PV Inverter Performance and Reliability: What is the Role of the Bus Capacitor?", Photovoltaic Specialists Conference (PVSC), vol. 2, Jun. 2012, 6 pages.

\* cited by examiner

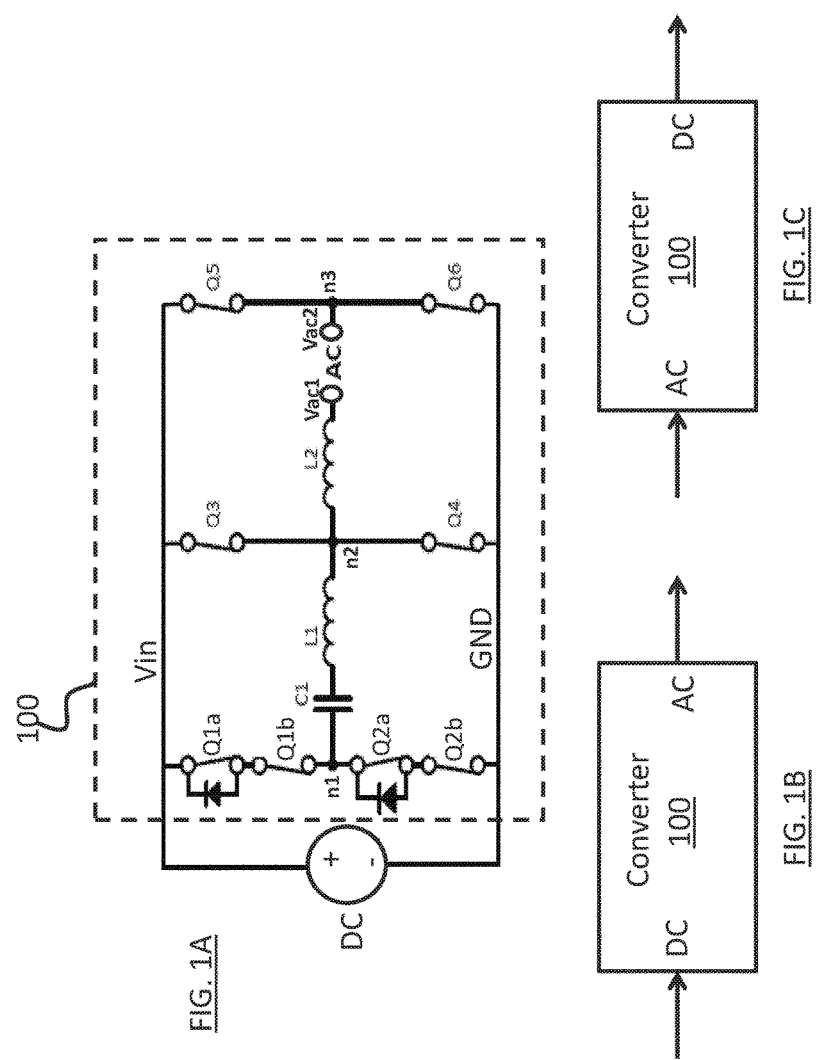

CIRCUIT WITH LOW DC BIAS STORAGE CAPACITORS FOR HIGH DENSITY POWER CONVERSION

CROSS-REFERENCE TO RELATED APPLICATIONS

This application claims priority to U.S. Provisional Patent Application No. 62/195,207, filed Jul. 21, 2015, titled "CIRCUIT WITH LOW DC BIAS STORAGE CAPACITORS FOR HIGH DENSITY POWER CONVERSION," the entire disclosure of which is hereby incorporated herein by reference.

BACKGROUND

Field

Embodiments relate generally to electronic power circuits, and more particularly, to circuits for DC-AC power inverters and AC-DC power converters.

Description of the Related Technology

The conversion of direct current (DC) to alternating current (AC) or AC to DC is necessary in many electronic power systems. Conversion is part of the design of solar inverters, electric vehicles, industrial equipment, mobility devices, and home appliances. In many of these applications, space is at a premium and it is desirable to perform high power-density conversion in minimal volume. In some devices, multiple levels of conversion are needed, for instance to convert from the AC line voltage to a high voltage DC bus, then back to multiple AC phases to drive an induction or other brushless motor. In these cases, it is desirable to have optimized, compact circuit assemblies that can convert between DC and AC in either direction and may be replicated as many times as required.

Devices which convert from DC to AC are typically called inverters, while those that convert from AC to DC may be called DC power supplies or battery chargers. The term converter is henceforth used to encompass both DC-AC and AC-DC conversion.

SUMMARY

In one aspect a power converter comprises a first inverter leg, a second inverter leg, and a third inverter leg. The first inverter leg has a high side switch segment connected between a first DC node and a first common node and a low side switch segment connected between the first common node and a second DC node. The second inverter leg has a high side switch segment connected between the first DC node and a second common node and a low side switch segment connected between the second common node and the second DC node. The third inverter leg has a high side switch segment connected between the first DC node and a third common node and a low side switch segment connected between the third common node and the second DC node. Additionally, a first reactive network is connected between the first common node and the second common node, and the first reactive network comprises a storage capacitor. Also, a second reactive network is connected between the second common node and the third common node, and the second reactive network has a first AC node and a second AC node. The high side switch segment and the low side switch segment of the first inverter leg, the second inverter leg, and the third inverter leg are configured to switch according to a cycle such that a voltage across the storage capacitor changes polarity during the cycle.

In another aspect a power converter comprises a first inverter leg, a second inverter leg, and a third inverter leg. The first inverter leg has a high side switch segment connected between a first DC node and a first common node and a low side switch segment connected between the first common node and a second DC node. The second inverter leg has a high side switch segment connected between the first DC node and a second common node and a low side switch segment connected between the second common node and the second DC node. The third inverter leg has a high side switch segment connected between the first DC node and a third common node and a low side switch segment connected between the third common node and the second DC node. Additionally, a first reactive network is connected between the first common node and the second common node, and the first reactive network comprises a storage capacitor. Also, a second reactive network is connected between the second common node and the third common node, and the second reactive network has a first AC node and a second AC node. The high side switch segment and the low side switch segment of the first inverter leg, the second inverter leg, and the third inverter leg are configured to switch so as to convert an AC power source applied between the first AC node and the second AC node into a DC power source derived between the first DC node and the second DC node. The high side switch segment and the low side switch segment of the first inverter leg, the second inverter leg, and the third inverter leg are also configured to switch so as to convert a DC power source applied between the first DC node and the second DC node into an AC power source derived between the first AC node and the second AC node.

In another aspect a method of operating a power converter to power AC equipment from a DC input source comprises: controlling a plurality of legs of the power converter according to a plurality of cycles, each cycle having a plurality of phases such that a storage capacitor of the power converter stores and transfers energy according to the plurality of phases; and charging and discharging the storage capacitor such that a voltage across the storage capacitor changes polarity during each cycle.

In another aspect a method of operating a power converter to power DC equipment from an AC input source comprises: controlling a plurality of legs of the power converter according to a plurality of cycles, each cycle having a plurality of phases such that a storage capacitor of the power converter stores and transfers energy according to the plurality of phases; and charging and discharging the storage capacitor such that a voltage across the storage capacitor changes polarity during each cycle.

BRIEF DESCRIPTION OF THE DRAWINGS

These drawings and the associated description herein are provided to illustrate specific embodiments of the invention and are not intended to be limiting.

FIG. 1A is a switch-level diagram of a voltage converter in accordance with the teachings herein.

FIG. 1B is a system flow diagram of the voltage converter of FIG. 1A for converting DC power to AC power in accordance with the teachings herein.

FIG. 1C is a system flow diagram of the voltage converter of FIG. 1A for transforming AC power to DC power according to an embodiment.

DETAILED DESCRIPTION OF EMBODIMENTS

Figure 1D:
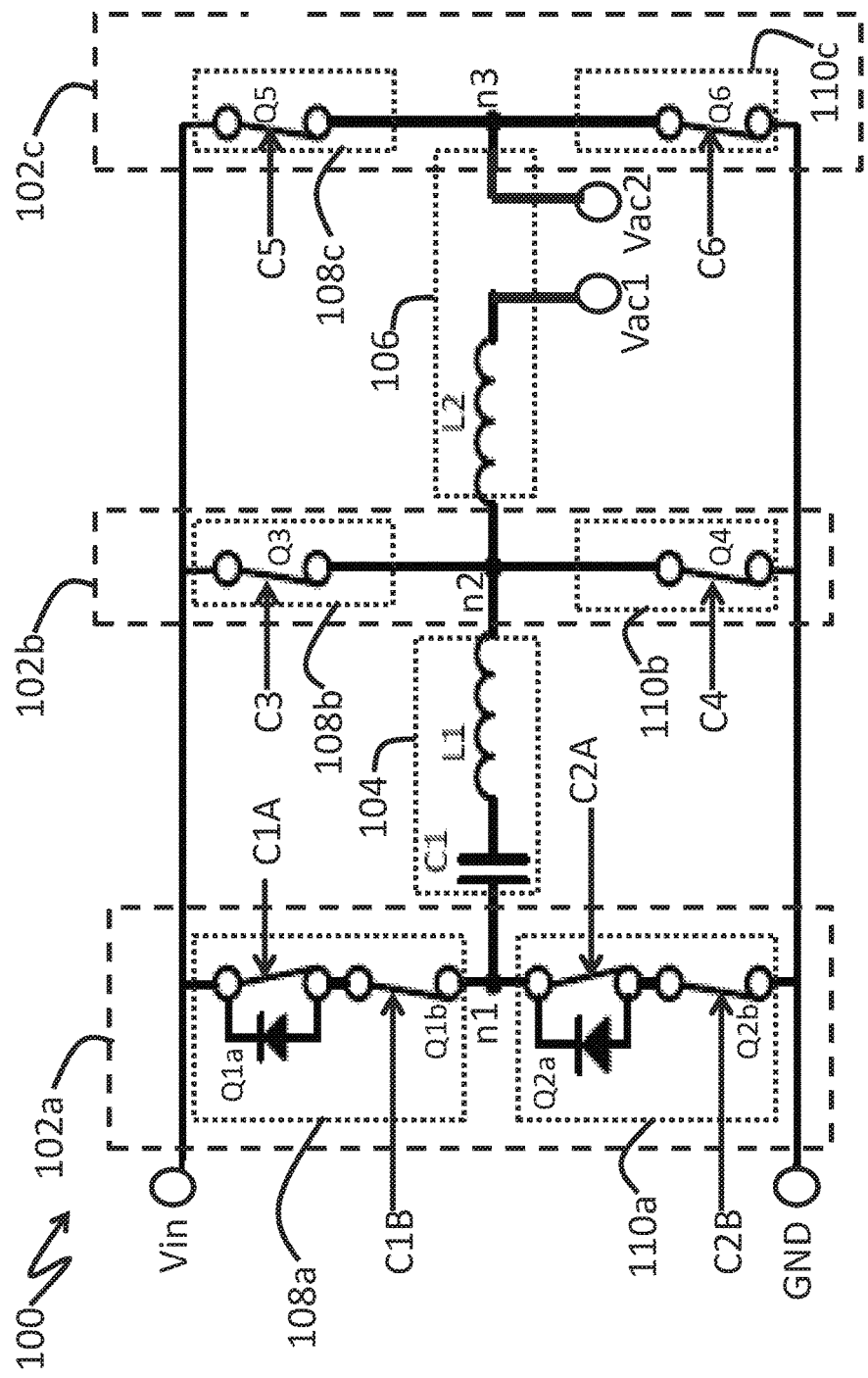
FIG. 1D is a diagram of a switch-level diagram of the voltage converter of FIG. 1A showing inverter legs with control signals according to an embodiment.

The following detailed description presents various descriptions of specific embodiments. However, the principles and advantages taught herein can be embodied in a multitude of different ways as defined and covered by the claims. In this description, reference is made to the drawings where like reference numerals may indicate identical or functionally similar elements.

When converting DC to AC, without input filtering, the input delivers a large double-frequency ripple current because the input cyclically supplies high current when the AC output voltage is high and supply low current when the output voltage is low. This undesirable input ripple current is double the output frequency because the current peaks twice per cycle for the positive and negative halves of the cycle.

The simplest technique to reduce the ripple is to add a passive input filter using a large capacitor across the input. However, for high power circuits, this capacitor is physically large and the large capacity calls for the use of unreliable electrolytic capacitors. The input capacitance to keep the input at a voltage V within a ripple of deltaV at power level P is governed by the equation:

$$C = P/2\pi F V \cdot \text{delta} V$$

In this equation, as ripple voltage deltaV approaches zero, the capacitance C approaches infinity. The problem is that only a small part of the energy storage capability of the capacitor is being utilized. The full energy storage of a capacitor is defined as $$W = \tfrac{1}{2} C V^2,$$

while with a passive filter, the energy delivered by the capacitor is just $$W = \tfrac{1}{2} C V \cdot \text{delta} V$$

The ripple percentage translates directly into the percentage of the capacitor storage capability that is being used. The capacitance to hold the ripple to 3% would be 33.3 times larger than if the full energy storage of the capacitor could be utilized.

Recognizing this problem, others have proposed active filter circuits for ripple power cancellation. In particular, U.S. Pat. Nos. 8,279,642 8,325,499 and 8,767,421 originally assigned to SolarBridge employ an active filter using an energy storage unit to cancel the ripple currents from the DC input. However, the circuits disclosed in these patents employ a capacitor with a non-zero DC bias because the capacitor voltage is never reversed and the average bias stays between zero and the DC input voltage. The energy storage capability of some families of capacitors, including Class 2 multi-level ceramic chip capacitors (MLCCs), is severely reduced by the DC bias. Key characteristics of several different storage technologies are shown in Table 1:

TABLE 1

Storage density of representative capacitors and inductors.

| Type | Representative Part Number | V, C or I, L | Volume | Energy Density | Density Ratio |
| --- | --- | --- | --- | --- | --- |
| MLCC Class 2 (BaTiO3) | TDK C5750X6S2W225K250KA | 450 V 2.2 uF | .0798 cc | 2.79 J/cc | 1 |
| MLCC Class 2 50% DC bias | TDK C5750X6S2W225K250KA | 450 V 0.7 uF | .0798 cc | .89 J/cc | 1/3.1 |
| MLCC Class 1 (NP0) | TDK C5750C0G2W104K280KA | 450 V 0.1 uF | .0884 cc | .11 J/cc | 1/24.4 |
| Aluminum electrolytic | Chemi-Con EKMG401ELL220MK25S | 400 V 22 uF | 3.9 cc | .45 J/cc | 1/6.2 |
| Aluminum Polymer | Nichicon PCV2B120MCL1GS | 125 V 12 uF | 1.0 cc | .09 J/cc | 1/30.1 |
| Film capacitor | Vishay MKP1848C62050JP4 | 500 V 20 uF | 28.4 cc | .09 J/cc | 1/31.8 |
| Inductor | Vishay HLP6767GZER100M01 | 25 A 10 uH | 2.1 cc | .0015 J/cc | 1/1915 |

Table 1 includes a range of technologies that can operate at high enough voltages or currents to be of interest in most power converter applications. Supercapacitors have been omitted because they currently operate at much lower voltages. The first three rows are all MLCCs (multi-level ceramic capacitors), but the type of dielectric and operating mode have a large effect on the usable energy density. High-capacitance MLCCs, known as Class 2, are built using a ferroelectric dielectric such as Barium Titanate (BaTiO$_3$) with a very high dielectric constant. The Class 2 MLCCs have high energy density, but their capacitance (and energy density) drop off sharply when used in a circuit that subjects the capacitor to an average DC bias. In the technologies of interest, Class 2 MLCCs have a clear energy density advantage when used in circuits with no DC bias. However, with 50% DC bias, the representative 2.2 uF MLCC capacitor has an effective capacitance of just 0.7 uF and suffers approximately a 3:1 energy disadvantage compared to circuits that operate the capacitor in a mode with no average DC bias. Class 1 MLCCs use a different type of dielectric, such as titanium oxide ($TiO_2$) or calcium zirconate ($CaZrO_3$), and are known as NP0 dielectrics because the negative and positive temperature coefficients are 0+−30 ppm/deg C. Class 1 dielectrics do not suffer from the DC bias degradation, but the much lower dielectric constant creates a large energy density disadvantage. The table shows a Class 1 MLCC in a similar package to the Class 2 MLCC, but the much lower capacitance makes its nominal energy density a factor of 24 lower. The table shows that Class 2 MLCCs have large energy density advantage over other technologies when the circuit can operate them without DC bias. Class 2 MLCCs are not as stable as Class 1 MLCCs over wide temperature ranges. The Class 2 MLCC in the table has an "X6S" dielectric and its capacitance can vary by +−22% from −55 C to +105 C. In applications with wide temperature variations, the circuit can be designed with the total capacitance increased by 22%. This results in a small decrease in effective energy density but can compensate for the wider variation over temperature.

The SolarBridge patents suggest the use of film capacitors instead of MLCCs. Electrolytic capacitors such as the aluminum and aluminum polymer capacitors in the table were rejected due to their known low reliability. The SolarBridge patents propose using film capacitors or inductors which have an even greater density disadvantage to MLCCs.

Note that Table 1 shows the extremely low storage density of high current inductors which store energy according to the equation $$W=\tfrac{1}{2}LI^2$$

At reasonable current levels and at power line frequencies of 50 or 60 Hz and the energy density of inductor technology is several orders of magnitude lower than that of MLCC, electrolytic and film capacitor technologies.

Therefore it is an object of the current disclosure to provide a compact, reliable converter based on a circuit that stores energy in a capacitor as a positive charge during part of the AC cycle, and stores energy as a negative charge during another part of the AC cycle. It is a further object to provide a high density inverter with energy stored in multi-level ceramic chip capacitors.

Previous inverter systems have not proposed the use of the same techniques to be used in reverse to make AC-DC converters with unity power factor. It is also an object of the current disclosure to operate a converter in either direction to provide AC-DC or DC-AC conversion. This capability may reduce component count, reduce costs and improve reliability in applications where power conversion takes place in both directions. For instance, the DC battery in an electric vehicle may be charged from the AC grid, but later the battery may supply power back to the AC grid during times of peak demand or when the main grid power fails. The present invention can eliminate the need to replicate the high-power components for the charging and the grid-drive inverter circuits.

Therefore, it is a further object to provide combinations of AC-DC and DC-AC compact inverters for a variety of applications including solar inverters, electric vehicles, industrial equipment, mobility devices, and home appliances.

It is a further object of the disclosure to provide high-efficiency conversion through single-stage conversion with output current delivered partially from the input and partially from the stored energy in a capacitor.

It is also an object of the current disclosure to provide a converter with improved energy efficiency by constructing it with multiple parallel-connected, multi-level chip capacitors to reduce the ESR (effective storage resistance) of the storage capacitor.

It is a further object of the disclosure to provide a converter in which the current flow is controlled by dividing the AC cycle into six phases.

The skilled artisan will appreciate that not all embodiments meet all objects noted herein, and that the scope of protection is defined by the claims appended at the end of this disclosure, regardless of whether all or any of the aforementioned objects are met.

The teachings herein include embodiments to convert DC to AC and AC to DC at high power densities. The circuit stores energy via large positive and negative voltage changes in bipolar capacitors, alternating positive and negative charging of the capacitor and maintaining the average DC voltage near zero. The use of Class 2 MLCCs can thereby be used to advantage. In addition to providing improvements in power density, MLCCs have additional benefits because they have inherent high reliability because the dielectric is a solid ceramic material that can withstand high temperatures without failure. In addition, the low ESR (effective series resistance) of each MLCC, and the ability to parallel a large number in small volume, lowers the total ESR and reduces the energy losses during charging and discharging, providing an efficiency advantage over other circuits.

The circuit in a preferred embodiment has a single-stage instead of requiring separate stages for converting to and from an intermediate DC bus.

The circuit in a preferred embodiment may operate with sinusoidal AC voltages but the techniques are not restricted to sinusoidal and can also operate with other waveforms such as triangular waveforms. The circuit is also operable when the AC waveform is a modified sinusoid that is pre-compensated based on the known characteristics of the output filter, thereby producing sinusoidal output after passing through the filter.

The circuit incorporates a filter to prevent ripple (when converting DC to AC), or to present a near-unity power factor when converting AC to DC. In either case, during the AC cycle, there are periods when the input current is above or below the current threshold for driving the output. When excess input current is available, the excess over the average charges a capacitor, and when the input current is too little, the capacitor is discharged and used to augment the output drive to make up the difference. When the magnitude of the input current matches the threshold for driving the average output current, the capacitor is not being charged or discharged. These points, where the capacitor current is zero and is transitioning between charging and discharging, cause a change in the control algorithm, and define the boundaries of different phases of the AC cycle. Additional phase transitions are defined at the ends and midpoint of the AC cycle where the current crosses zero. For sinusoidal AC waveforms, the phase transitions are calculated to be approximately 0, 39.5, 140.5, 180, 219.5, 320.5 and 360 degrees.

A switch level diagram of a preferred embodiment is shown in FIG. 1A. Eight switches Q1A, Q1B, Q2A, Q2B, Q3, Q4, Q5, and Q6 may be implemented with silicon MOSFETs, insulated-gate bipolar transistors (IGBTs) or wide bandgap semiconductors such as Gallium Nitride (GaN) or Silicon Carbide (SiC) power devices.

DC to AC

Figure 2:
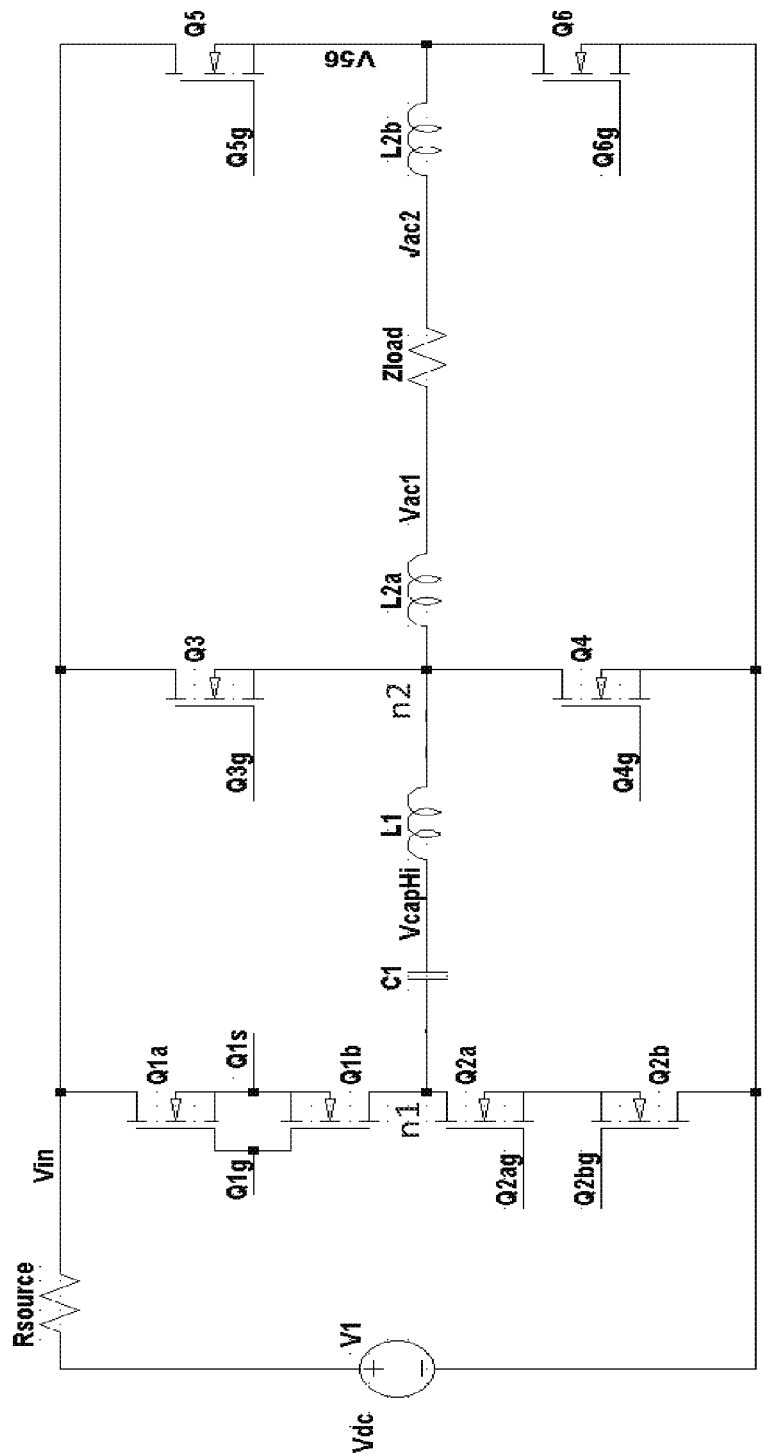
FIG. 2 is a schematic diagram of a voltage converter in accordance with the teachings herein.

FIG. 2 shows a simplified schematic for DC-AC operation with the AC output connected to a load (represented by resistor) Zload. In DC to AC applications, switches Q5 and Q6 switch only at AC crossings, with Q6 on during the positive half of the AC cycle and Q5 on during the negative half of the cycle. Switches Q3, Q4 and buck inductors L2a and L2b form a synchronous buck converter to drive output current from the DC input rail to the AC output. This buck converter can operate in either continuous or non-continuous mode, as is well known in the art. The required ratio of output to input current determines the duty cycle for driving switches Q3 and Q4. In continuous mode, switch Q4 is driven as the complement of switch Q3 other than fixed dead time when both are off to prevent shoot through currents. The buck inductors, L2a and L2b, may be lumped into a single inductor, such as inductor L2 of FIG. 1A, or as shown, they may be a pair of inductors with each connected to one of the AC outputs across the load Zload. Alternatively, the AC outputs may pass through a common mode filter including a pair of coupled inductors, and the buck inductance may be provided by the leakage inductance of the common mode filter.

Switches Q1a and Q1b, with sources connected to each other, together serve as a reverse-blocking switch that can block positive voltages above the positive DC rail. Similarly, switches Q2a and Q2b can block negative voltages below the DC minus or ground rail. Such blocking is desirable because the capacitor may hold a charge that makes the voltage of one of its terminals above or below the rails and single MOSFETs would not block those voltages because the body diode of, for example, an N-channel MOSFET, conducts when the drain voltage is below the source voltage even if the gate is not driven.

When switch Q2b is on, a boost converter is formed from switch Q4, the diode across switch Q2a, and inductor L1. The capacitor C1 can be charged either positive or negative by turning on switches Q3 and Q2ab, or by turning on switches Q4 and Q1ab.

When C1 is sufficiently charged, it can be discharged directly to the load by turning on either switch Q2ab or switch Q1ab, but as the charge decreases, the voltage on capacitor C1 is less than the load voltage and it becomes desirable to use the boost circuit formed by inductor L1 and one of switch Q4 (or switch Q3) plus and diode across switch Q1b (or switch Q1a) to draw the remaining charge from capacitor C1. For instance, during the positive half of the cycle in Phase 1, current can be driven to the AC output from capacitor C1 by turning on switch Q4 to draw current through inductor L1, then releasing switch Q4 to cause the output of inductor L1 to rise and drive current through the load. The diode could be replaced instead by careful control of switches Q1ab and Q2ab to form a synchronous boost circuit, but the diode also serves to rectify any oscillations due to the series connection of inductor L1 and capacitor C1.

In a preferred embodiment of a 2 KW DC to AC converter, capacitor C1 can have a minimum of 33 uF and inductors L1 and L2 can be in the range of 1-10 uH. The value of capacitor C1 increases linearly with power level to store and supply the additional energy required for DC-AC ripple reduction or AC-DC power factor correction.

Figure 5A:
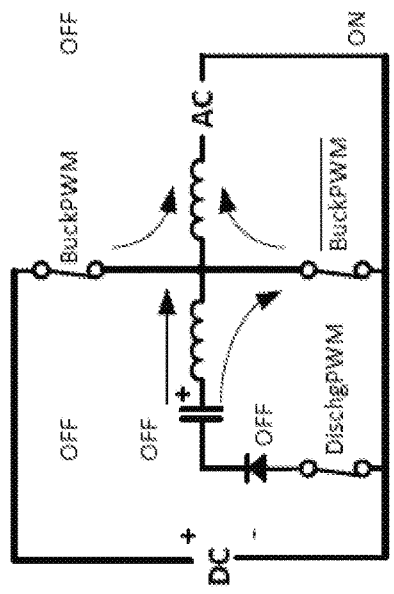
FIGS. 5A-5F show six phases corresponding to current flow in the six phases of an AC cycle of an inverter constructed according to one embodiment.
Figure 5B:
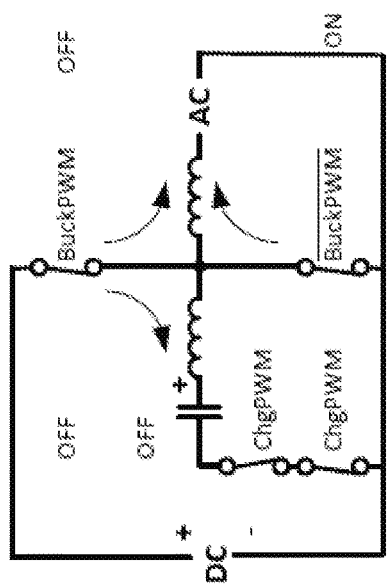
Figure 5C:
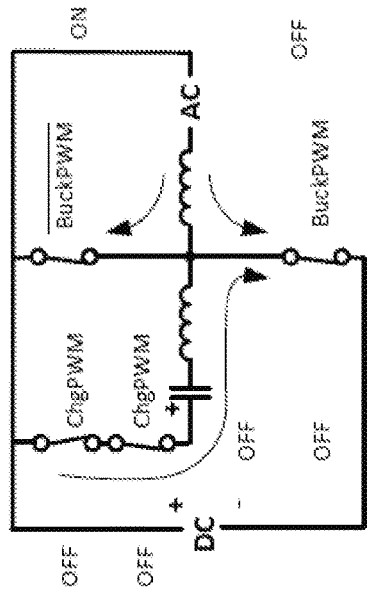
Figure 5D:
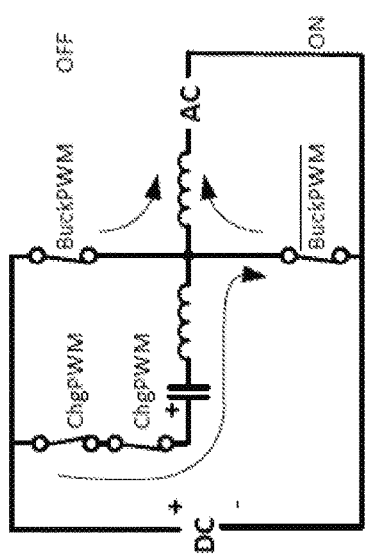
Figure 5E:
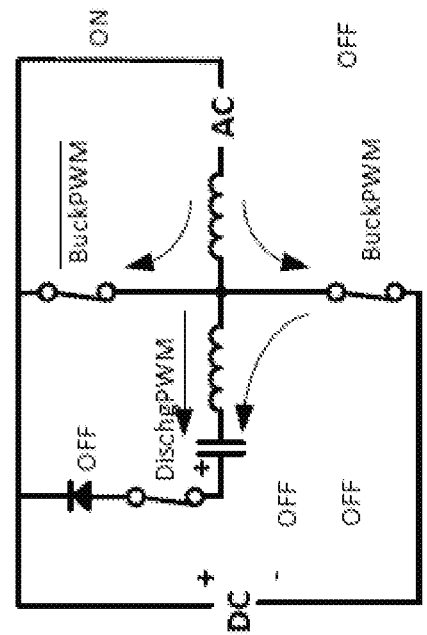
Figure 5F:
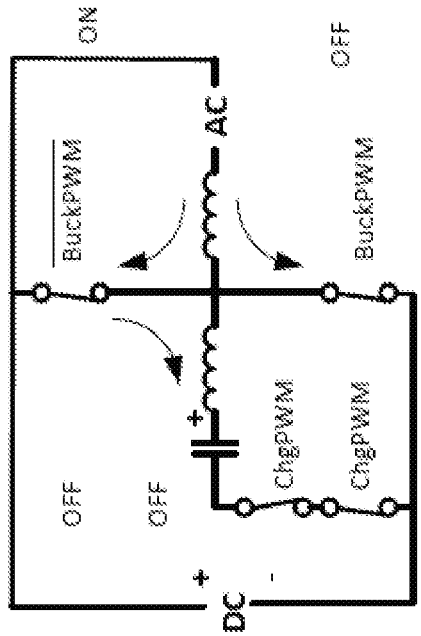
Figure 6:
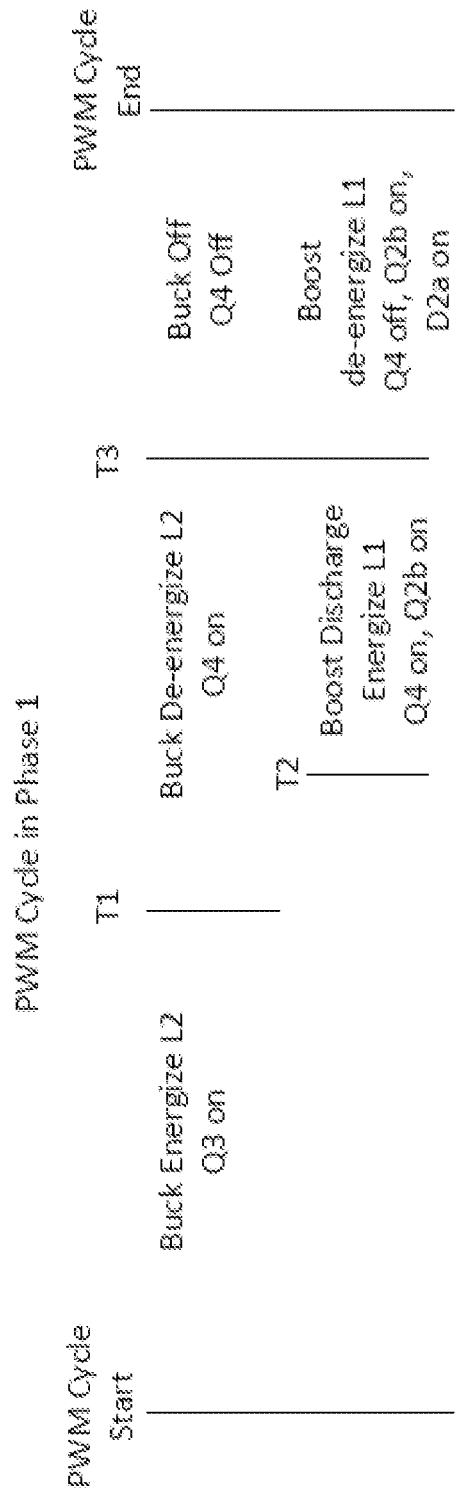
FIG. 6 is a diagram showing the timing of control signals during Phase 1 of a DC to AC inverter constructed according to one embodiment.

FIG. 5 shows the flow of current through the inductors L1 and L2 in each of the six phases in the DC to AC case. FIG. 6 shows the details of how the buck and boost circuits are controlled to sum currents to the output during Phase 1. FIG. 7 shows the resulting waveforms for input currents, capacitor voltage, and output currents. When power levels are lowered, the capacitor voltage amplitude decreases to make the energy storage match the required energy to cancel out the input ripple.

Note that the intermediate waveforms in FIG. 7 are not sine waves. Unlike other ripple-cancellation techniques, the current path is divided between the buck circuit and capacitor circuit and neither circuit is required to drive the peak output load. By dividing the output current into two paths, the conduction losses are reduced and efficiency is increased.

Figure 8:
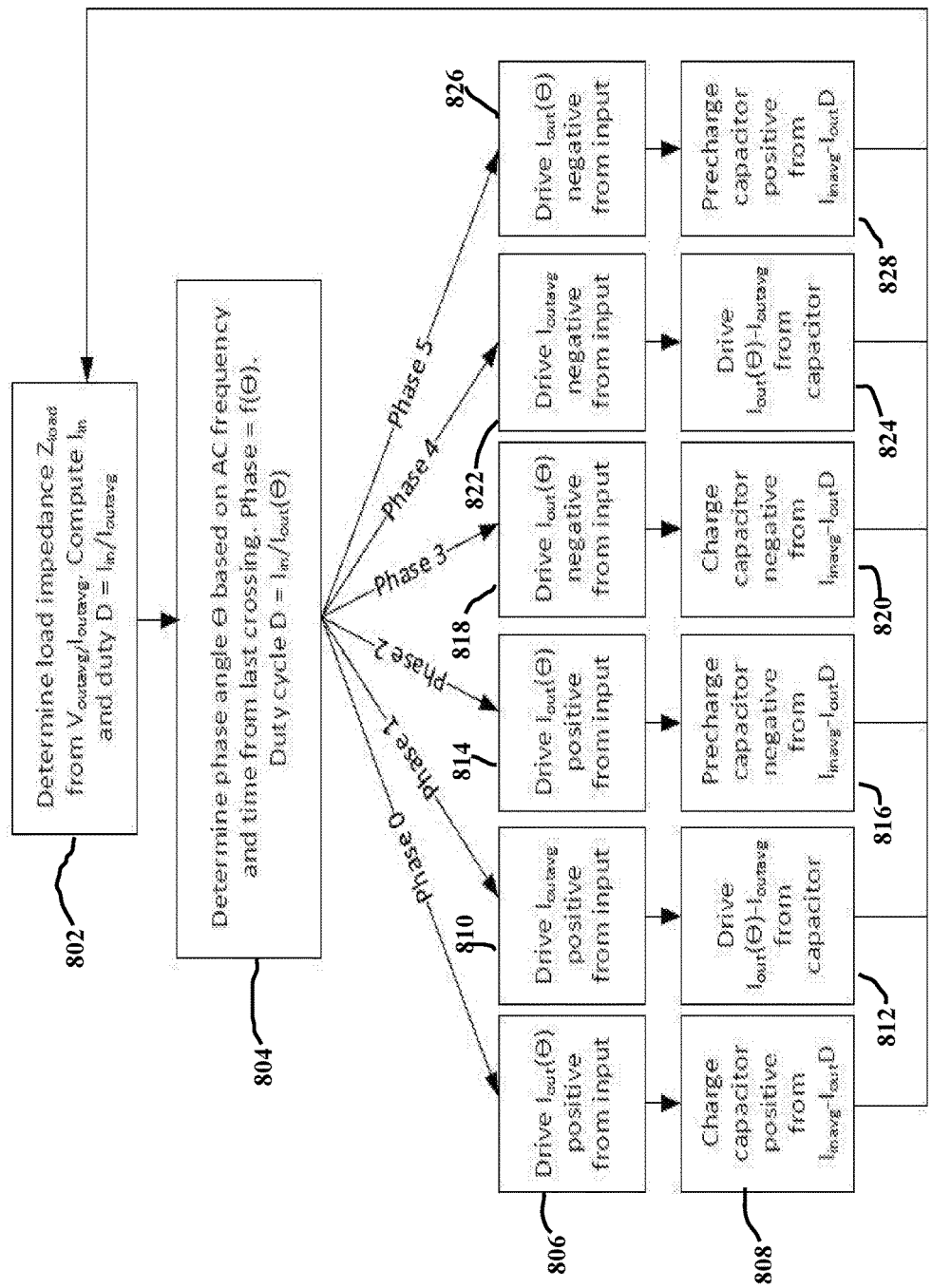
FIG. 8 is a flowchart of a process performed in the six phases when converting DC to AC.

FIG. 8 shows a process executed by the microcontroller or other control circuitry in order to control the current flow to realize a DC to AC converter. At the beginning of each phase, a microcontroller may configure the circuit to perform the appropriate buck or boost operation based on the value of the timers, input voltage, desired output, and determination of the output load.

AC to DC

When converting AC to DC, similar concepts apply and the capacitor C1 stores the energy to avoid the situation in which a power supply presents a reactive load to the source. In many prior designs, such as those for motor drive, it is common to use two stages of conversion and connect the AC input through a bridge rectifier to a "DC Bus" storage capacitor to produce high voltage DC, and then to drive the output voltage or phases from a PWM controller powered from the high voltage DC. The problem with such designs using a bridge rectifier, is that much of the power to the motor comes from the AC peaks rather than of drawing current evenly throughout the AC cycle as would be the case with a resistive load. The embodiments can be used to replace the bridge rectifier and the DC bus capacitor with a circuit that presents a substantially resistive load, thereby approaching a unity power factor.

In the AC to DC case, when the DC output voltage is greater than the AC input, the circuit uses inductor L2 to boost the input voltage to the output voltage and the L1 inductor is used to boost the capacitor voltage above the output voltage when it is driving the output. The AC cycle is broken into the same six phases based on when the input voltage, although the capacitor voltage is phase shifted compared to the DC-AC case, with the capacitor charged positive during phase 1 and charged negative during phase 4. When the amplitude of the AC input is high, the input is used both to charge the capacitor and drive the load. When the AC input amplitude is low, a portion of the output current is driven from the boosted AC input and the rest comes from the stored energy in the capacitor boosted to the DC output voltage by inductor L1.

Another variation of the circuit can be used to drive DC outputs lower than the peak AC input. The circuit is modified to keep the body diodes of switches Q3 and Q5 from conducting during AC input peaks. Both switches Q3 and Q5 are modified to be reverse-blocking switches using bi-directional switches such as a configuration using pairs of switches as previously described for Q1a+Q1b and Q2a+Q2b. In this case the inductor L2 is sometimes used as a boost inductor and sometimes as a buck inductor depending on whether the AC input voltage amplitude is greater or less than the output voltage.

Figure 9:
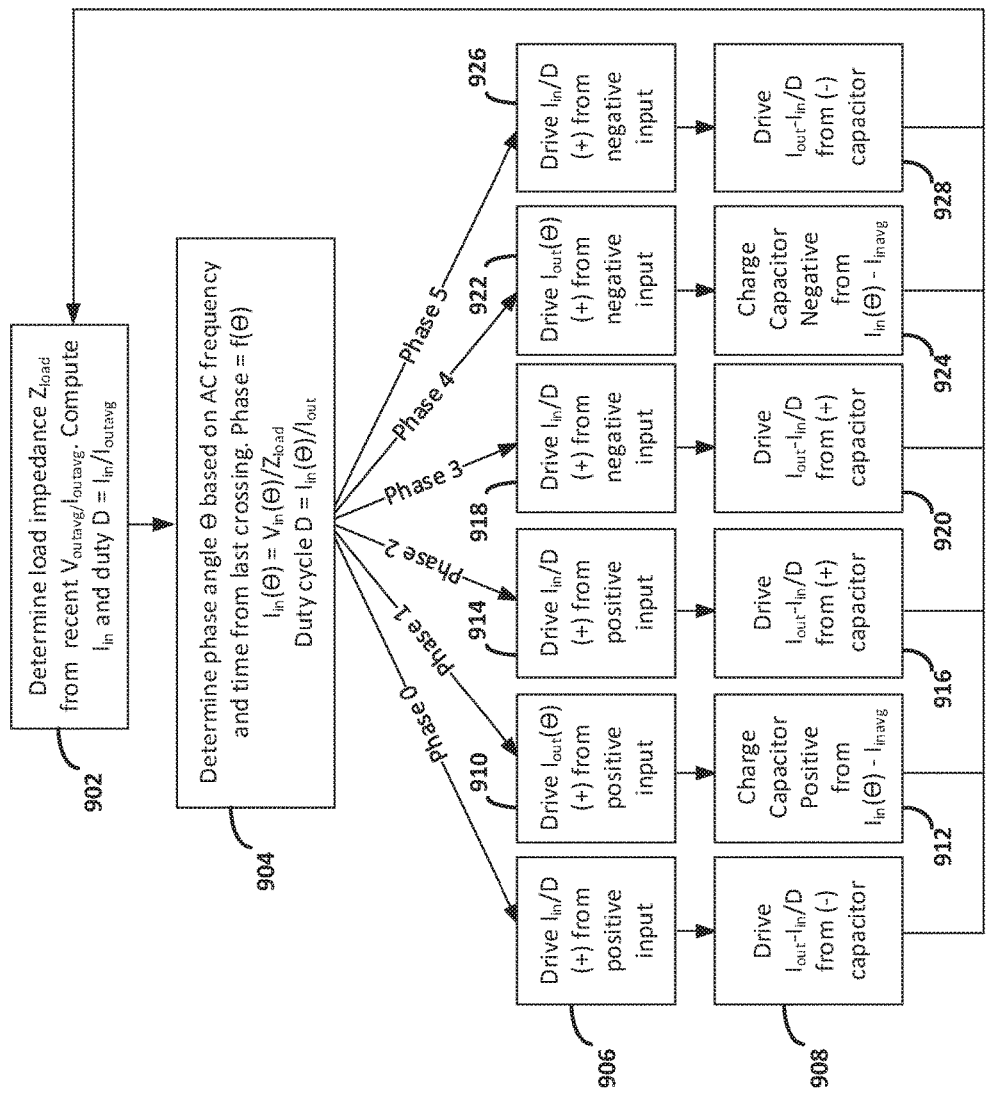
FIG. 9 is a flowchart of a process performed in the six phases when converting AC to DC.

FIG. 9 shows a process executed by the microcontroller or other control circuitry in order to control the current flow to realize an AC to DC converter.

Control Circuits

The control circuitry can be implemented with a microcontroller with outputs connected to high and low side MOSFET drivers. In a preferred embodiment, the high resolution timer in an ST STM32F334 microcontroller, commercially available from STMicroelectronics NV of Geneva, Switzerland, is used to generate the PWM timing signals for driving the MOSFET gates. At each phase transition, an interrupt or polling loop notifies the controller to change the output gate drive configuration to the next phase.

The gate drive circuitry desirably employs a voltage that is generally in the range of 10-20 volts. In a preferred embodiment, 13V is supplied by a buck converter based on the ST Viper22A™ PWM controller, commercially available from STMicroelectronics NV of Geneva, Switzerland, that can accept input up to 730V input. The supply to the microcontroller uses a conventional buck or linear converter to convert the 13V to 3.3V. The 13V circuit can be powered from DC for a DC-AC converter, or from rectified AC in an AC-DC converter.

Converter Circuit Applications

Figure 3A:
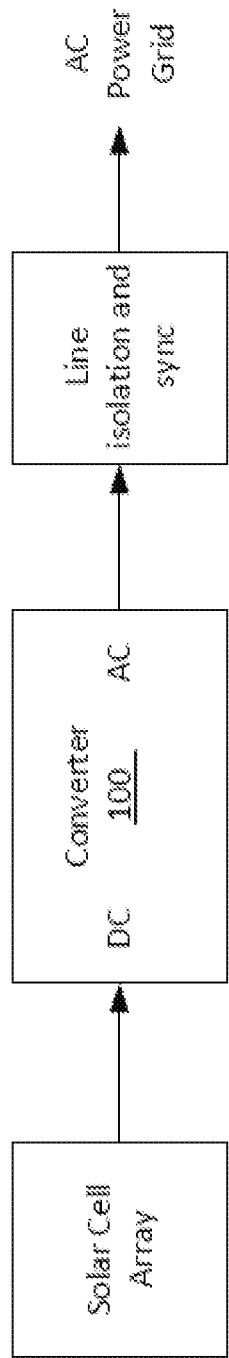
FIG. 3A-3D are diagrams illustrating applications of the converter circuits in accordance with the teachings herein.

FIGS. 3A-3D and 4A-4B show typical applications of converter circuits implemented according to the described embodiments. FIG. 3A is a solar inverter that takes DC input from a solar cell array and produces AC output. The output may be coupled to the power grid through an isolation circuit comprising an isolation transformer and a circuit to synchronize the AC output generation with the line frequency. Variations may include insertion of a boost stage between the solar cell array and converter to boost the output of the solar cell array to a voltage above the peak line voltage as may be desirable in microinverter applications.

Figure 3B:
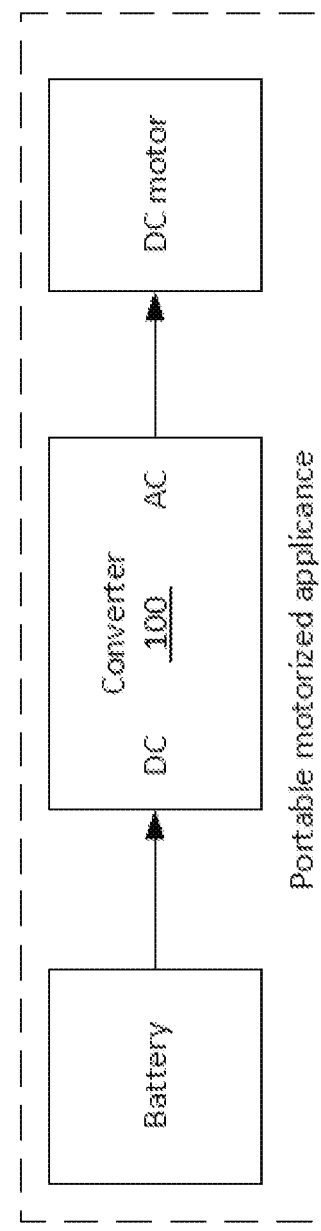

FIG. 3B shows the converter 100 used in a portable, battery operated motorized appliance such as a scooter, electric motorcycle, or portable compressor built with a single phase AC motor such as a single-phase induction motor, split phase motor, or shaded pole motor. Depending on the type of motor, the speed may be controlled by varying the output frequency of the converter by changing the timebase of the counter used to time the Phase 0-5 sequencing, or the speed can be changed by varying the average output voltage by changing the duty cycle.

Figure 3C:
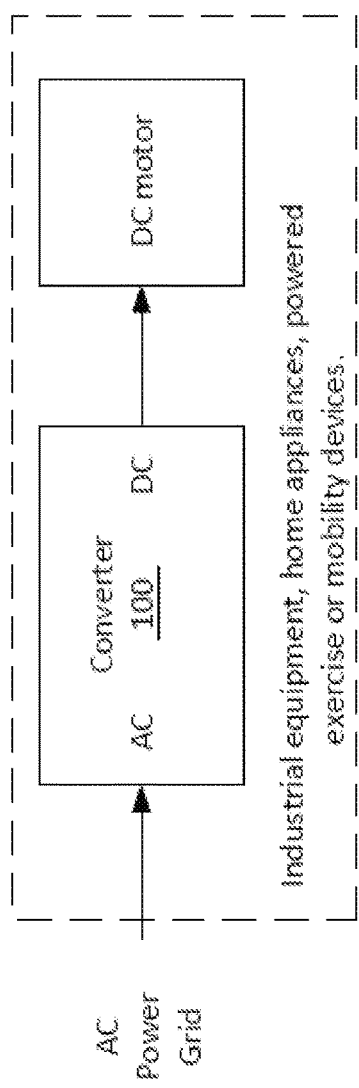

FIG. 3C shows a converter 100 for AC to DC conversion to drive a DC motor. The DC motor speed is governed directly by the converter by changing the effective load impedance in order to produce higher or lower output voltage.

Figure 3D:
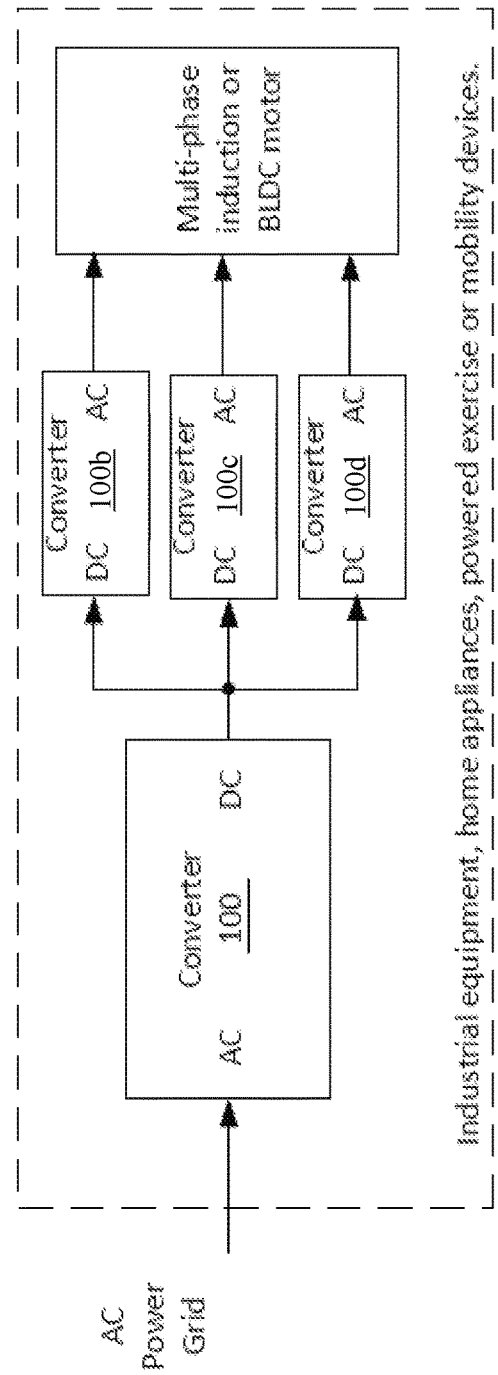

FIG. 3D shows the converter 100 used with converters 100*b-d* in AC powered equipment incorporating a multi-phase motor such as an induction motor or brushless DC motor. One converter 100 is used to produce a DC voltage; converters 100*b-d*, each similar to converter 100, can operate as additional DC to AC converters, one per motor phase, to convert the DC back to AC at the frequency selected to run the motor at the desired speed. At a given speed, the output converters each present a constant load to the input converter allowing the input to be near unity power factor. The output converters each have a phase output referenced to that converter's negative DC input. By connecting all three references to the same DC input, the outputs are effectively in a wye configuration, as is well known in multi-phase motor control.

Figure 4A:
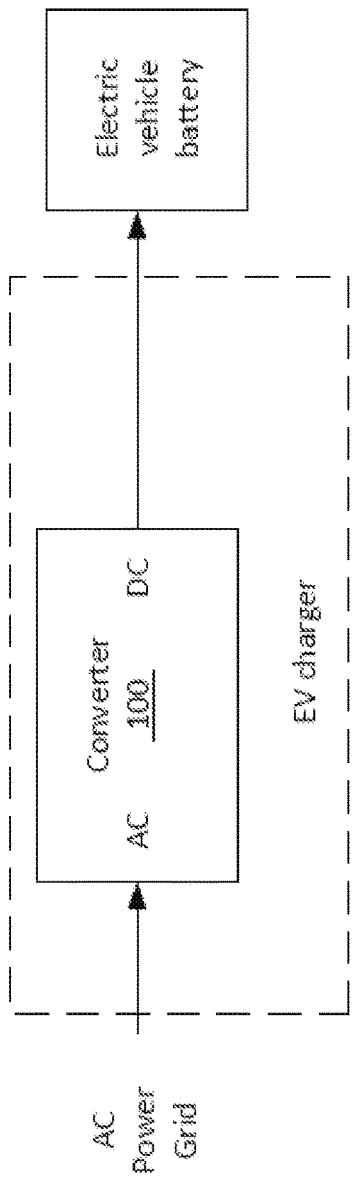
FIG. 4A-4B are diagrams illustrating electric vehicle applications of the converter circuits in accordance with the teachings herein.

FIG. 4A shows the converter 100 used in a charger for an electric vehicle. This charger may be inside the vehicle or external to the vehicle. As is common in battery chargers, the converter may charge at a constant current output while the battery voltage is low, and a constant voltage output when the charge nears completion. The built-in boost capability of the converter can boost the output above the peak AC input to handle cases where the battery pack DC voltage is higher than the peak AC input.

Figure 4B:
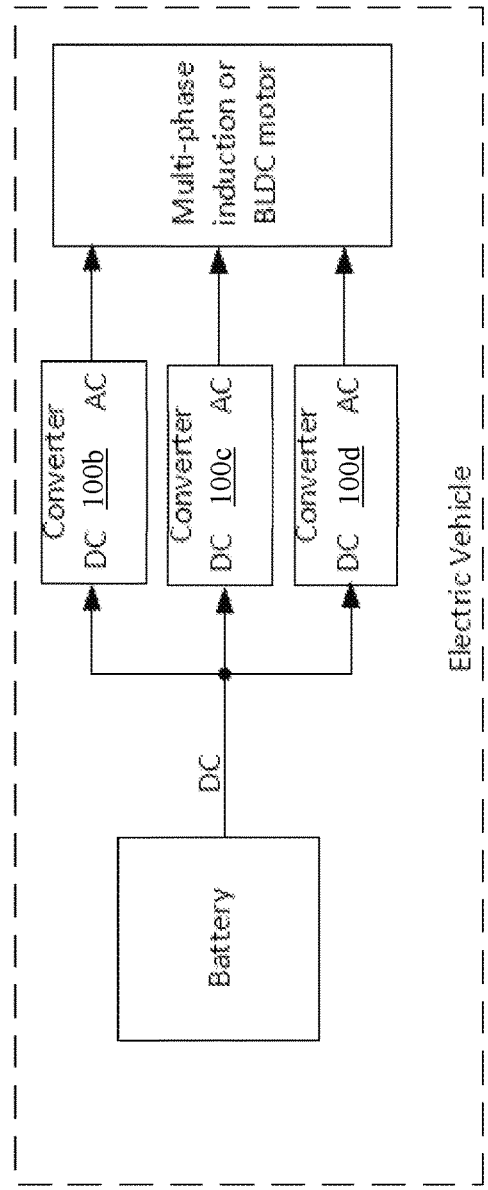

FIG. 4B shows the use of multiple converters 100*b-d*, each similar to converter 100, to control the battery pack to motor in an electric vehicle. The high voltage DC from the vehicle battery pack is converted to multiple AC phases whose frequency determines the vehicle speed. The outputs of the multiple inverters may be wye-connected as previously discussed.

FIG. 1A is a switch level diagram showing the structure of an embodiment the converter 100. Switches Q1*a*, Q1*b*, Q2*a*, Q2*b*, Q3, Q4, Q5, and Q6 may be implemented with silicon MOSFETs or wide bandgap devices such as Gallium Nitride (GaN) or Silicon Carbide (SiC).

The DC source or load is connected between a Vin node and ground GND. The power inverter 100 has a switch Q1*a*, a switch Q1*b*, a switch Q2*a*, a switch Q2*b*, a switch Q3, a switch Q4, a switch Q5, a switch Q6, a capacitor C1, an inductor L1, and an inductor L3. The switch Q1*a* and the switch Q2*a* each have a parallel diode which can represent a body diode of an FET. The switches Q1*a*, Q1*b*, Q2*a*, Q2*b*, Q3, Q4, Q5, and Q6 are controlled to provide an AC voltage output or drive an AC load between a node Vac1 and a node Vac2.

FIG. 1B is a system flow diagram 100 of the power inverter for converting DC power to AC power in accordance with the teachings herein. The system flow diagram 100 can be a "black box" system level representation of the inverter 100 of FIG. 1A where a DC input is received between nodes Vin and GND and an AC output is derived between the nodes Vac1 and Vac2.

FIG. 1C is a system flow diagram of the power inverter used as a converter for transforming AC power to DC power according to an embodiment. The system flow diagram 100 can be a "black box" system level representation of the inverter 100 of FIG. 1A where an AC input is received between nodes Vac1 and Vac2 and a DC output is derived between the nodes Vin and GND.

FIG. 1D is a diagram of a power inverter 100 showing inverter legs 102*a-c* with control signals according to an embodiment. FIG.1D shows the power inverter 100 of FIG. 1A with control signals necessary for converting a DC voltage between the nodes Vin and GND to an AC voltage between the nodes Vac1 and Vac2. The power inverter 100 has an inverter leg 102*a*, an inverter leg 102*b*, an inverter leg 102*c*, a reactive network 104, and a reactive network 106. The inverter leg 102*a* has a high side switch segment 108*a* connected to a low side switch segment 110*a* at a common node n1. Similarly, the inverter leg 102*b* has a high side switch segment 108*b* connected a low side switch segment 110*b* at a common node n2; and the inverter leg 102*c* has a high side switch segment 108*c* connected to a low side switch segment 110*c* at a common node n3. The reactive network 104 is connected between nodes n1 and n2, and the reactive network 106 is connected between nodes n2 and n3. Also, as shown in FIG. 1D, the AC output is provided between the nodes Vac1 and Vac2 which are within the reactive network 106.

As shown in FIG. 1D the high side switch segment 108*a* has the switch Q1*a* and the switch Q1*b* connected in series between the node Vin and the node n1. The switch Q1*a* receives a control signal C1A and the switch Q1*b* receives a control signal C1B. Also, the low side switch segment 110*a* has the switch Q2*a* and the switch Q2*b* connected in series between the node n1 and ground GND. The switch Q2*a* receives a control signal C2A and the switch Q2*b* receives a control signal C2B.

The high side switch segment 108*b* has the switch Q3 connected between the node Vin and the node n2; while the low side switch segment 110*b* has the switch Q4 connected between the node n2 and ground GND. The switch Q3 receives a control signal C3, while the switch Q4 receives a control signal C4. Similarly, the high side switch segment 108c has the switch Q5 connected between the node Vin and the node n3; while the low side switch segment 110c has the switch Q6 connected between the node n3 and ground GND. The switch Q5 receives a control signal C5, while the switch Q6 receives a control signal C6.

The control signals C1A-B, C2A-B, C3-6 can control the switches of the high side switch segments 108a-c and the switches of the low side switch segments 110a-c to have control phases and to operate in different modes including a pulse width modulation (PWM) mode or an on/off switch mode. Using combinations of PWM and switch modes, the control signals can cause the inverter to operate in phases or control phases so as to control the voltage variations across the capacitor C1. In this way the ripple current can be reduced while allowing the capacitance of the capacitor C1 to be reduced.

FIG. 2 shows a simplified schematic of the converter in DC-AC mode. The diodes of FIG. 1 may be the body diodes Q1a and Q2a, or external diodes may be added. Inductors L2a and L2b may be combined into a single L2 inductor, may be separate inductors, or may represent the leakage inductance of an output common mode filter used for EMI suppression.

Input and output filters to filter out PWM noise are not shown. Depending on distortion requirements, these may be small added capacitance across input and output, or may involve multi-stage LC filters.

When converting DC to AC, L2 is the buck inductor while L1 is a boost inductor used to fully discharge the capacitor and raise the voltage driven to the load.

FIGS. 3A-3D as described above show applications including industrial equipment, home appliances, powered exercise or mobility devices.

FIGS. 4A-4B as described above show electric vehicle applications including EV charging and EV drive trains.

FIGS. 5A-5D show the current flow by phases and also show the direction of current supplied through each of the switches and inductors. Switches that remain fully on or off during a phase are omitted for clarity. In all phases, the buck PWM circuit alternates between turning on the top switch (Q3) and bottom switch (Q4). The capacitor charge circuit is timed to take advantage of the current state of the buck PWM and charge the capacitor by turning on Q1ab or Q2ab at the appropriate time to charge the capacitor high or low. Similarly, during Phase 1 or Phase 4, the timing of Q2b or Q1b drives current from the capacitor through L1 as part of the boost cycle.

The Phase 1 timing is shown in more detail in FIG. 6. The time T3 is based on the capacitor voltage RC decline through Phase 1. More boost time is employed as the capacitor is discharged. Time T1 is set to make ratio of T1/Cycle equal to Iavg. Time T2 is set to make (T3−T2)/(Cycle−T3) the desired boost to make up difference between Iavg and Iout.

Times T1, T2, and T3 may be determined by current or voltage feedback or use feed-forward control based on known load impedance, input and output voltages, and capacitance/inductance values. A slower high level control loop may determine the load impedance by seeing if capacitor was over or under charged at the end of Phase 1 or 4 (whether the ripple was exactly cancelled or more/less required from input).

Figure 7A:
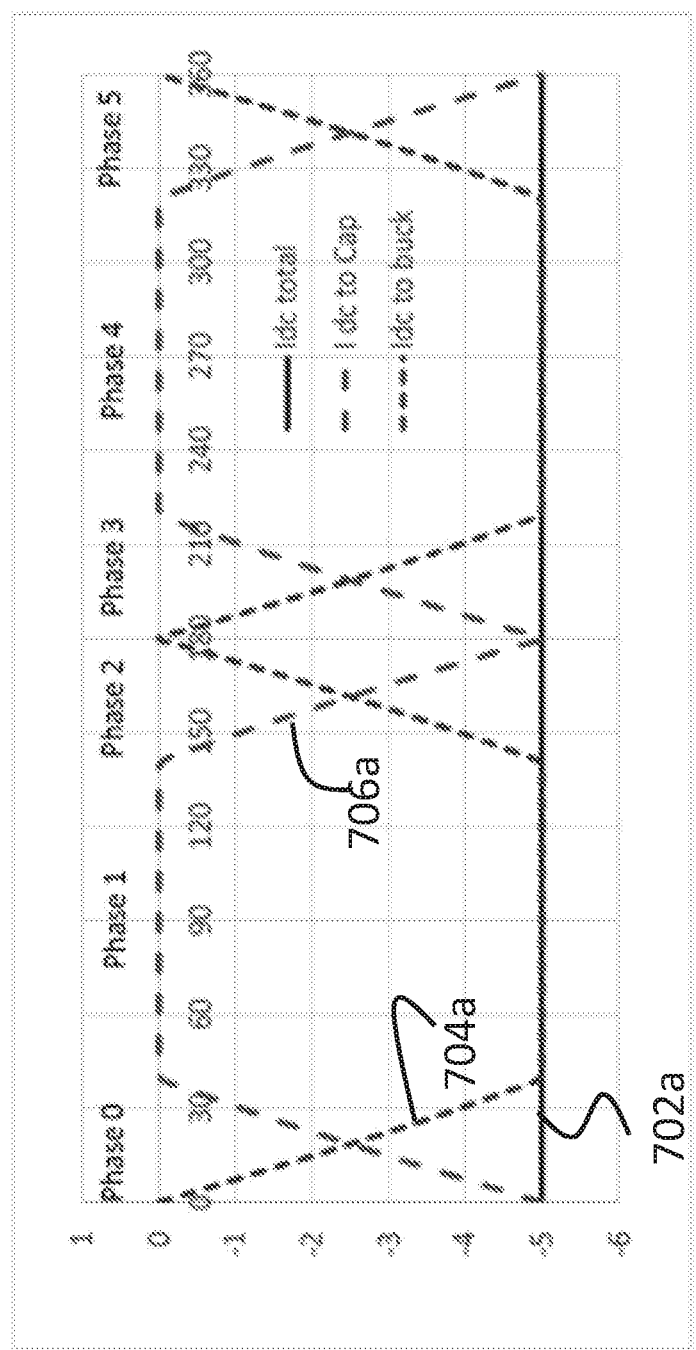
FIG. 7A-C are graphs showing the input currents, capacitor voltage, and output currents of a circuit in accordance with embodiments.
Figure 7B:
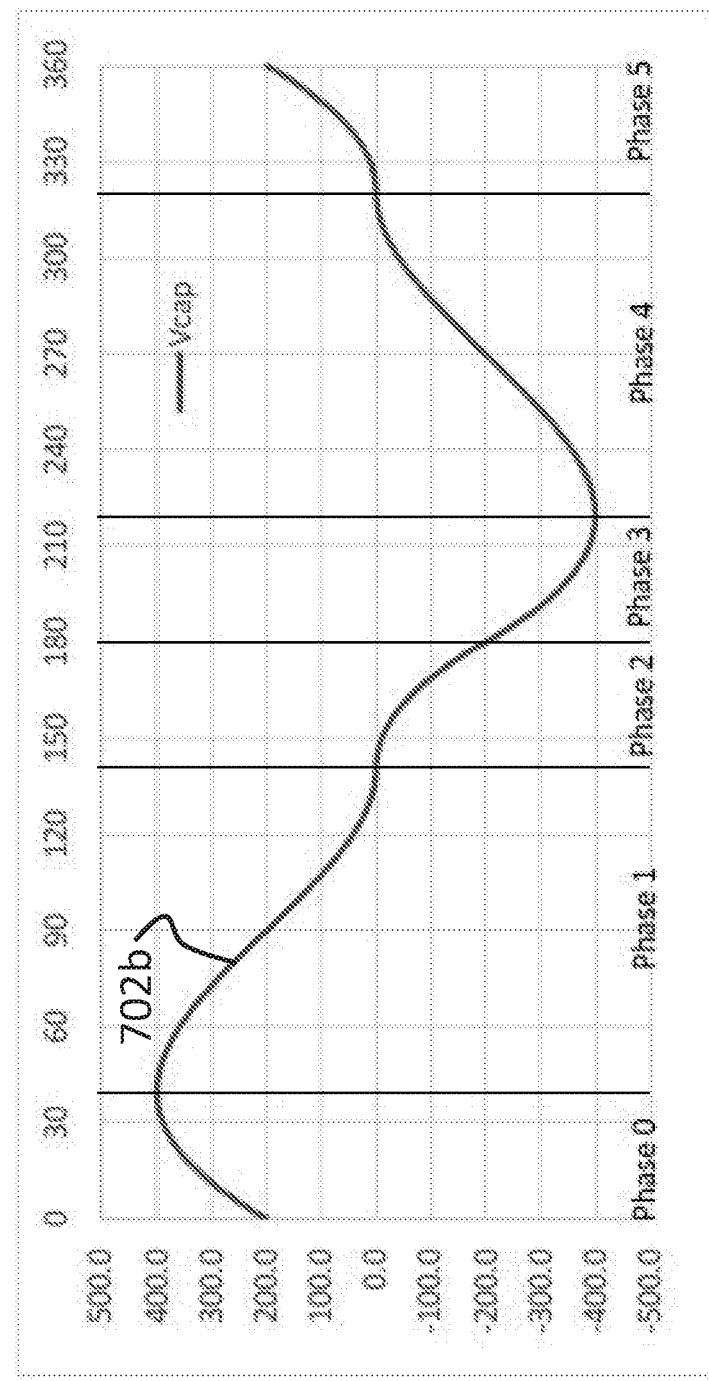
Figure 7C:
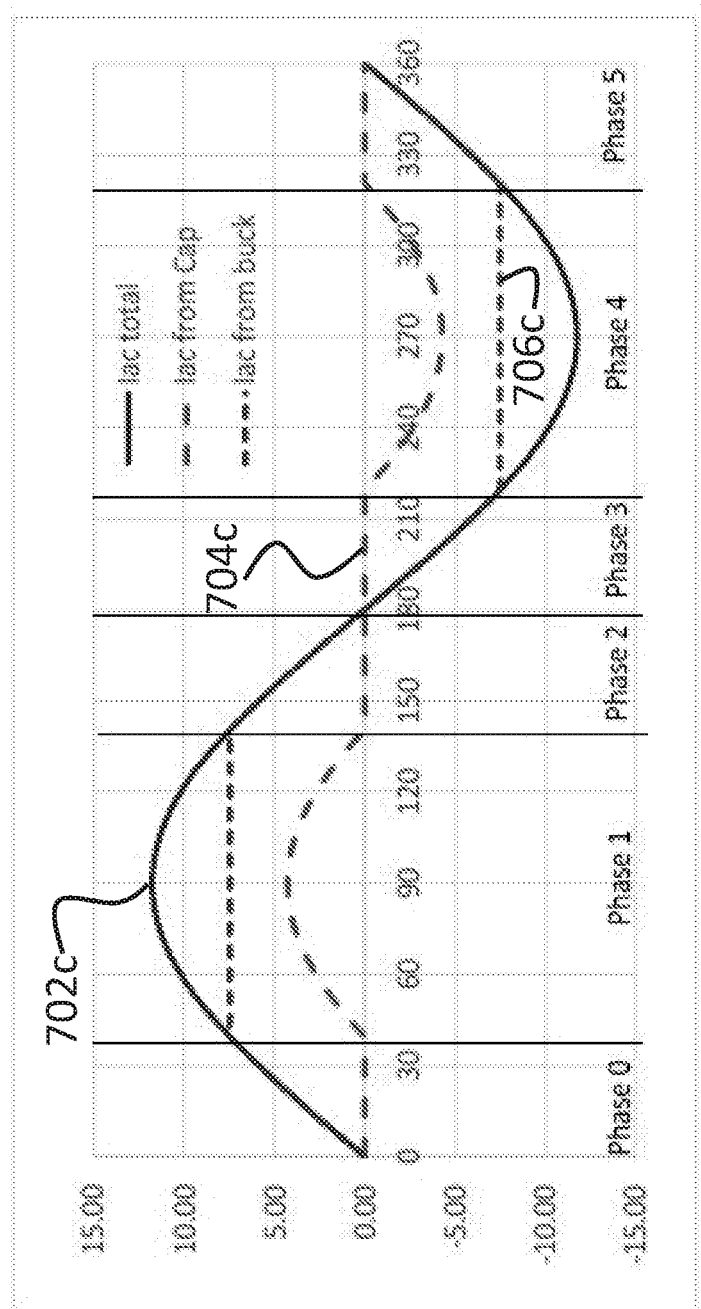

FIGS. 7A-C. are graphs showing the input currents, capacitor voltage, and output currents of a circuit in accordance with embodiments.

FIG. 7A shows that the input current 704a to drive the load Zload, when added with the input current 706a to charge the capacitor C1, sums to a constant input value without ripple (Idc total 702a). The scale shows the input for a 450V DC input fed through at 10 ohm input resistance to a 2 KW inverter. The constant 5A input drops 50V across the input resistance and the resulting 400V input is converted to sinusoidal 240V RMS at the output.

FIG. 7B shows the capacitor voltage 702b that spans nearly the full +400V to −400V range of the input voltage amplitude when the capacitance value is set to 33 uF. In practice, slightly more capacitance may be used to allow for component variations and changes in capacitance with temperature when the converter is run at its maximum rated power level. Note that at the beginning of Phase 1, the capacitor C1 is fully charged to +400 V and the full stored energy is supplied to the load during Phase 1. At the end of Phase 1, the capacitor C1 is fully discharged to near zero volts. Then in Phases 2 and 3 the capacitor is precharged/charged to −400V and that stored energy is delivered to the load during Phase 4. This plot of capacitor voltage shows that the capacitor C1 has high amplitude positive and negative charged/discharge periods every cycle to take advantage of the maximum energy storage of each capacitor which is determined by ½C*deltaV squared. This sequence also maintains near zero average DC bias on the capacitor.

FIG. 7C shows the current contribution 706c from the buck circuit, the current contribution 704c from the capacitor boost circuit, and the total output current 702c. Neither the buck circuit nor capacitor circuit need to individually supply the full peak output current.

FIG. 8 is a flowchart of a process performed in the six phases 0-5 of conversion from DC to AC. In block 802 the load impedance Zload is determined by observing the average output voltage Voutavg and average output current Ioutavg, computing the input current Iin, and calculating a duty cycle D given by the ratio of the input current Iin to the average output current Ioutavg. In these calculations the input source receives a DC (direct current) from a source such as a solar cell or a battery and the AC power is delivered to an output, represented by the load Zload, such as an electronic device or appliance (e.g., motor) operating on AC power, or an AC power grid.

In block 804 a phase angle θ is an AC frequency phase angle determined in part by the AC frequency value, and a time interval from a crossing of an AC signal. The duty cycle can be related to the ratio of the input current to the phase dependent or sampled value of the output current Iout(θ); and the phase is determined from the phase angle as illustrated and described above with respect to FIGS. 5A-5F and also FIGS. 7A-7C. As illustrated in FIGS. 7A-7C, the phase can be one of six phases, phase 0-5, defined by a range of phase angles and can be expressed as a function f(θ). For instance, as shown in the example of FIGS. 7A-7C, phase 0 is defined over the range of phase angles from 0 to 30 degrees. Similarly, phase 1 is defined over a range of 30 to 150 degrees; phase 2 is defined over a range of 150 to 180 degrees; phase 3 is defined over a range of 180 to 210 degrees; phase 4 is defined over a range of 210 to 330 degrees; and phase 5 is defined over a range of 330 to 360 degrees. During block 804, the duty cycle as a function of θ is calculated from the ratio of the input current Iin to the phase dependent output current Iout(θ).

Depending on the phase, phase 0-5, one of six control sequences are selected. The phase 0 control sequence comprises blocks 806 and 808. In block 806 the output current Iout(θ) is forced positive by virtue of controlling the circuit and its switches to operate as shown in FIG. 5A. In block 808 the capacitor C1 is charged to have a positive voltage by a current determined by a difference of the average input current Iinavg and the product of the output current Iout times the duty cycle D.

The phase 1 control sequence comprises blocks 810 and 812. In block 810 the average output current is controlled to have a positive flow direction by controlling switches as shown in FIG. 5B. In block 812 the capacitor C1 delivers a current equal to the difference of the output current Iout(θ) and the average output current Ioutavg.

The phase 2 control sequence comprises blocks 814 and 816. In block 814 the output current Iout(θ) is controlled to have a positive flow direction by controlling switches as shown in FIG. 5C. In block 816 the capacitor C1 is precharged to have a negative voltage due to a net current equal to the difference of the average input current Iinavg and the product of the output current Iout times the duty cycle D.

The phase 3 control sequence comprises blocks 818 and 820. In block 818 the output current Iout(θ) is controlled to have a negative flow direction by controlling switches as shown in FIG. 5D. In block 820 the capacitor C1 is charged to have a negative voltage by a current determined by a difference of the average input current Iinavg and the product of the output current Iout times the duty cycle D.

The phase 4 control sequence comprises blocks 822 and 824. In block 822 the average output current is controlled to have a negative flow direction by controlling switches as shown in FIG. 5E. In block 824 the capacitor C1 delivers a current equal to the difference of the output current Iout(θ) and the average output current Ioutavg.

The phase 5 control sequence comprises blocks 826 and 828. In block 826 the output current Iout(θ) is controlled to have a negative flow direction by controlling switches as shown in FIG. 5F. In block 828 the capacitor C1 is precharged to have a positive voltage by a current equal to the difference of the average input current Iinavg and the product of the output current Iout times the duty cycle D.

FIG. 9 is a flowchart of a process performed in the six phases 0-5 when converting AC to DC. In block 902 an output current is determined by calculating a load impedance Zload, which can be equivalent to calculating a driving point impedance, from sampled values of the output voltage and output current. In these calculations an input source provides an AC source, such as an AC power grid or wall outlet, and the output receives the DC power, such as a battery to be charged. Because the conversion is from AC to DC, the load Zload can represent driving point impedance as described in block 902. In block 904 a phase angle θ is determined based on the AC frequency and a crossing point on a time axis. The phases phase 0-5 are calculated from a phase angle dependent function f(θ). During block 904 the phase dependent input current Iin(θ) is calculated from the ratio of the phase dependent input voltage Vin(θ) and the load Zload. The duty cycle is also calculated from the ratio of the input current Iin(θ) and the sampled output current Iout from block 902.

Depending on the phase, one of phases 0-5, one of six control sequences are selected. The phase 0 control sequence comprises blocks 906 and 908. In block 906 the output current Iout is driven from the negatively charged capacitor and positive input by virtue of controlling the circuit and its switches. The switch settings for phase 0 of the AC-DC case are similar to the switch settings of Phase 1 of the DC-AC case as shown in FIG. 5B, but with the current arrow reversed to show the DC output driven from the AC input.

In block 908 the positively charged capacitor C1 drives the remainder of the required output current.

The phase 1 control sequence comprises blocks 910 and 912. In block 910, during the high-amplitude, positive portion of the AC waveform, the input current is split between charging capacitor C1 and driving the output. The switch settings for phase 1 of the AC-DC case are similar to the switch settings of phase 2 of the DC-AC case as shown in FIG. 5C, but with all of the current arrows reversed.

The phase 2 control sequence comprises blocks 914 and 916. The phase 2 operation is similar to phase 0, with Iout driven from the positively charged capacitor and input.

The phase 3 control sequence comprises blocks 918 and 920. In block 918 the output current Iout is driven from the positively charged capacitor and netative input by virtue of controlling the circuit and its switches. The switch settings for phase 3 of the AC-DC case are similar to the switch settings of phase 4 of the DC-AC case as shown in FIG. 5E, but with the current arrow reversed to show the DC output driven from the AC input. In block 920 the positively charged capacitor C1 drives the remainder of the required output current.

The phase 4 control sequence comprises blocks 922 and 924. In block 922 during the high-amplitude, negative portion of the AC waveform, the input current is split between charging capacitor C1 negative and driving the output positive. The switch settings for phase 4 of the AC-DC case are similar to the switch settings of phase 5 of the DC-AC case as shown in FIG. 5F, but with the capacitor current arrow reversed.

The phase 5 control sequence comprises blocks 926 and 928. The phase 2 operation is similar to phase 3, with Iout driven from the negatively charged capacitor and input.

APPLICATIONS

Applications of the circuits include industrial equipment, home appliances, powered exercise, mobility devices and electric vehicle power systems. Devices employing the above converters can be implemented as AC to DC inverters and/or as DC to AC converters. Examples include DC to AC conversion in powering AC devices (appliances, motors) from a battery, or supplying energy from a batter or solar cell to an AC power grid. Other examples include AC to DC conversion in charging batteries from a wall outlet or power grid; and powering DC devices from a wall outlet or power grid. Note that the same converter can be used for both AC to DC inversion and DC to AC conversion. For example, the converter can be used for charging a battery with DC power from an AC input source (e.g., power grid). The same converter, or another like it, can be used when discharging the battery to the power grid (e.g., solar charged batteries feeding an AC power grid), or simply to power AC devices (e.g., appliances or motors).

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A power converter comprising:
   a first inverter leg having a high side switch segment connected between a first DC node and a first common node and a low side switch segment connected between the first common node and a second DC node;
   a second inverter leg having a high side switch segment connected between the first DC node and a second common node and a low side switch segment connected between the second common node and the second DC node;
   a third inverter leg having a high side switch segment connected between the first DC node and a third common node and a low side switch segment connected between the third common node and the second DC node;
   a first reactive network connected between the first common node and the second common node, wherein the first reactive network comprises a storage capacitor; and
   a second reactive network connected between the second common node and the third common node, wherein the second reactive network has a first AC node and a second AC node; wherein the high side switch segment and the low side switch segment of the first inverter leg, the second inverter leg, and the third inverter leg are configured to switch according to a cycle such that a voltage across the storage capacitor changes polarity during the cycle,
   wherein the high side switch segment of the first inverter leg includes a first high side FET configured to receive a first high side gate signal, a second high side FET configured to receive the first high side gate signal, the low side switch segment of the first inverter leg includes a first low side FET configured to receive a first low side gate signal, and a second low side FET configured to receive a second low side gate signal, wherein the first and the second high side FETs are connected in series as a bidirectional switch between the first DC node and the first common node, and wherein the first and the second low side FETs are connected in series as a bidirectional switch between the first common node and the second DC node,
   the high side switch segment of the second inverter leg includes a third FET configured to receive a third gate signal and the low side switch segment of the second inverter leg includes a fourth FET configured to receive a fourth gate signal, wherein the third FET is connected between the first DC node and the second common node and the fourth FET is connected between the second common node and the second DC node,
   the high side switch segment of the third inverter leg includes a fifth FET configured to receive a fifth gate signal and the low side switch segment of the third inverter leg includes a sixth FET configured to receive a sixth gate signal, wherein the fifth FET is connected between the first DC node and the third common node and the sixth FET is connected between the third common node and the second DC node,
   the first reactive network further comprises an inductor connected in series with the storage capacitor between the first common node and the second common node,
   the second reactive network comprises at least one inductor, and
   the first high side gate signal, the first low side gate signal, the second low side gate signal, the third gate signal, the fourth gate signal, the fifth gate signal, and the sixth gate signal are provided according to the cycle having six phases such that the power converter operates with an AC voltage between the first AC node and the second AC node, such that the power converter operates with a DC voltage between the first DC node and the second DC node, and such that the storage capacitor stores and transfers energy.

2. The power converter of claim 1, wherein the storage capacitor is a multi-level ceramic capacitor.

3. The power converter of claim 1, wherein the high side switch segment and the low side switch segment of the first inverter leg, the second inverter leg, and the third inverter leg are further configured to switch according to the cycle such that a ripple cancellation current of the power converter is non-sinusoidal.

4. The power converter of claim 1, wherein the high side switch segment and the low side switch segment of the first inverter leg, the second inverter leg, and the third inverter leg are further configured to switch such that the six phases comprises a zeroth phase, a first phase, a second phase, a third phase, a fourth phase, and a fifth phase, each defined by an AC frequency phase angle from an AC frequency phase angle range.

5. The power converter of claim 4, wherein the AC frequency phase angle is determined, at least in part, by an AC frequency value of a sampled AC current signal of the power converter.

6. The power converter of claim 5, wherein the power converter is configured to operate with an output current between the first AC node and the second AC node, and wherein the output current is positive when the direction of flow is from the second common node toward the third common node.

7. A power converter comprising:
   a first inverter leg having a high side switch segment connected between a first DC node and a first common node and a low side switch segment connected between the first common node and a second DC node;
   a second inverter leg having a high side switch segment connected between the first DC node and a second common node and a low side switch segment connected between the second common node and the second DC node;
   a third inverter leg having a high side switch segment connected between the first DC node and a third common node and a low side switch segment connected between the third common node and the second DC node;
   a first reactive network connected between the first common node and the second common node, wherein the first reactive network comprises a storage capacitor; and
   a second reactive network connected between the second common node and the third common node, wherein the second reactive network has a first AC node and a second AC node; wherein the high side switch segment and the low side switch segment of the first inverter leg, the second inverter leg, and the third inverter leg are configured to switch according to a cycle such that a voltage across the storage capacitor changes polarity during the cycle, wherein the cycle comprises a plurality of phases, wherein the high side switch segment and the low side switch segment of the first inverter leg, the second inverter leg, and the third inverter leg are further configured to switch such that the plurality of phases comprises a zeroth phase, a first phase, a second phase, a third phase, a fourth phase, and a fifth phase, each defined by an AC frequency phase angle from an AC frequency phase angle range, wherein the AC frequency phase angle is determined, at least in part, by an AC frequency value of a sampled AC current signal of the power converter wherein the power converter is configured to operate with an AC output voltage and an output current between the first AC node and the second AC node and with a DC voltage between the first DC node and the second DC node, and wherein the output current is positive when the direction of flow is from the second common node toward the third common node, wherein during the zeroth phase the output current is positive and the storage capacitor receives charge via the high side switch segment of the second inverter leg;

wherein during the first phase the output current is positive and the storage capacitor discharges via the low side switch segment of the first inverter leg;

wherein during the second phase the output current is positive and the storage capacitor receives charge via the high side switch segment of the first inverter leg;

wherein during the third phase the output current is negative and the storage capacitor receives charge via the high side switch segment of the first inverter leg;

wherein during the fourth phase the output current is negative and the storage capacitor discharges via the high side switch segment of the first inverter leg; and wherein during the fifth phase the output current is negative and the storage capacitor receives charge via the high side switch segment of the second inverter leg.

8. The power converter of claim 7, wherein the power converter is configured to convert the DC voltage to the AC output voltage.

9. The power converter of claim 7 wherein during the zeroth and the fifth phases the first high side gate signal controls the first high side FET to block current, the second high side gate signal controls the second high side FET to block current, the first low side gate signal pulse width modulates the first low side FET according to a charging timing pattern, and the second low side gate signal pulse width modulates the second low side FET according to the charging timing pattern;

wherein during the second and the third phases the first high side gate signal pulse width modulates the first high side FET according to a second charging timing pattern, the second high side gate signal pulse width modulates the second high side FET according to the second charging timing pattern, the first low side gate signal controls the first low side FET to block current, and the second low side gate signal controls the second low side FET to block current;

wherein during the first phase the first high side gate signal controls the first high side FET to block current, the second high side gate signal controls the second high side FET to block current, the first low side gate signal controls the first low side FET to conduct current through a low side body diode, and the second low side gate signal pulse width modulates the second low side FET according to a third charging timing pattern;

wherein during the fourth phase the first high side gate signal controls the first high side FET to conduct current through a high side body diode, the second high side gate signal pulse width modulates the second high side FET according to a fourth charging timing pattern, the first low side gate signal controls the first low side FET to block current, and the second low side gate signal pulse controls the second low side FET to block current;

wherein during the zeroth, the first, and the second phases the fifth gate signal controls the fifth FET to block current and the sixth gate signal controls the sixth FET to conduct current;

wherein during the third, the fourth, and the fifth phases the fifth gate signal controls the fifth FET to conduct current and the sixth gate signal controls the sixth FET to block current;

wherein during each of the six phases the third gate signal pulse width modulates the third FET and the fourth gate signal pulse width modulates the fourth FET according to a first or a second buck timing pattern.

* * * * *